Figure 1:
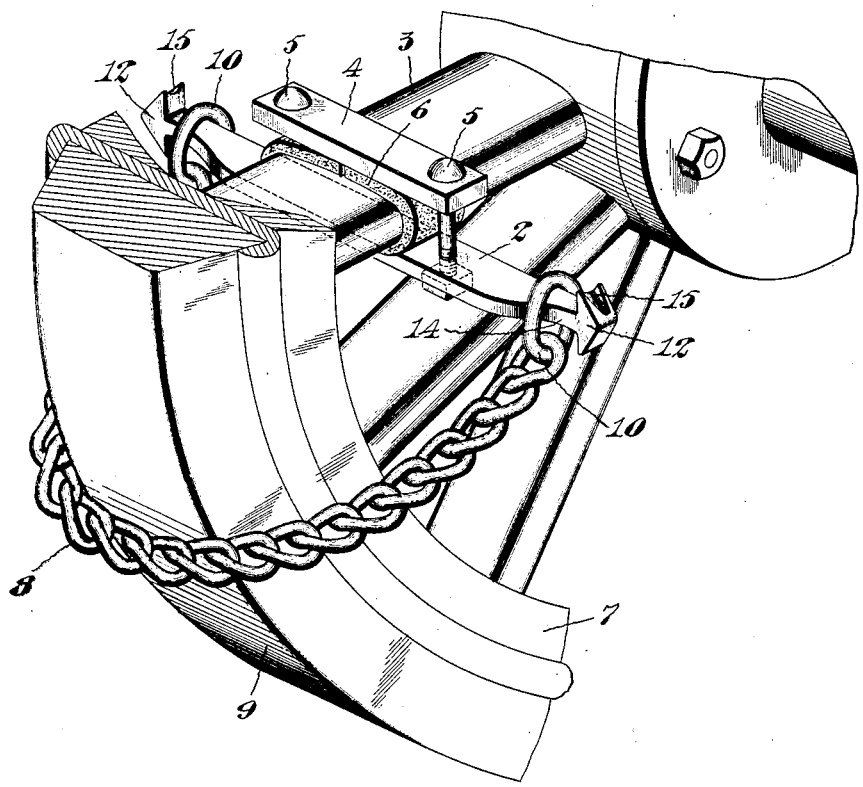

G. F. SNOW.
ANTISKID DEVICE.
APPLICATION FILED JUNE 10, 1920.

1,399,163.

Patented Dec. 6, 1921.

INVENTOR
George F. Snow,
By his Attorney,
J. H. McCready

UNITED STATES PATENT OFFICE.

GEORGE F. SNOW, OF PLYMOUTH, MASSACHUSETTS.

ANTISKID DEVICE.

1,399,163.           Specification of Letters Patent.           Patented Dec. 6, 1921.

Application filed June 10, 1920.   Serial No. 387,868.

*To all whom it may concern:*

Be it known that I, GEORGE F. SNOW, a citizen of the United States, residing at Plymouth, in the county of Plymouth and State of Massachusetts, have invented certain Improvements in Antiskid Devices, of which the following description, in connection with the accompanying drawings, is a specification, like reference characters on the drawings indicating like parts in the several figures.

This invention relates to anti-skid devices for trucks, automobiles and other vehicles, and it aims to devise an article of this character which can be permanently secured to the vehicle wheel and to which the chains or equivalent devices can be quickly and easily secured in operative position or removed therefrom. It is also an object of the invention to devise an article of this character which will effectually prevent the accidental removal of the chains from their operative positions, which will substantially eliminate the necessity of movable parts for this purpose, and which will be very strong and rugged in construction and capable of withstanding the rough usage to which articles of this character are subjected.

The nature of the invention will be readily understood from the following description when read in connection with the accompanying drawings, and the novel features will be particularly pointed out in the appended claims.

Figure 2:
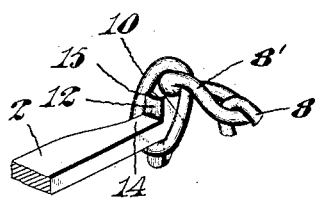

In the drawings,

Figure 1 is an angular view showing a device embodying the present invention and illustrating the manner in which it is secured to a vehicle wheel; and Fig. 2 is an angular view illustrating the manner in which the chain may be disconnected from its holding device.

The construction shown comprises a bar 2 secured to one of the spokes 3 of a vehicle wheel, the securing function being performed by a short bar 4 and two bolts 5—5 which pass through both the bars 2 and 4 and clamp it on the spoke. In order to prevent these bars from scoring the spoke 3 the spoke may be wound with one or more layers of felt, leather, or other protective material. Preferably the bar 2 is secured to the spoke immediately behind the felly 7 of the wheel, although it is shown in Fig. 1 as moved back somewhat for the purpose of illustrating the construction more clearly, and the upper portion of the felly is shown as cut away for this purpose.

This bar 2 performs the function of a holder or securing device for the cross chain 8 that is looped around the tread face of the tire 9 of the wheel and which prevents slipping or skidding of the wheel. The links 10—10 at opposite ends of this cross chain 8 are held on the bar 2 by means of heads 12—12 formed at the ends of the bar. The heads are connected to the main body of the bar by reduced neck portions 14. These two heads are substantially identical in construction and the description of one, therefore, applies to the other. It will be seen from an inspection of the drawings that the head 12 is of considerably greater length than width, the head being just wide enough to allow the link to pass freely over it when in the position shown in Fig. 2. A groove or notch 15 is cut in the upper end of the head to receive the edge of the link 8′ next adjacent to the end link 10 when this end link is being passed over the head. To state this construction in a different way, the head is only slightly smaller in width than the width of the opening in the end link 10 and from the bottom of the neck 14 to the notch 15 the head is only slightly less in length than is the distance from one end of the opening in the link to the edge of the next adjacent link 8′ which also passes through this opening. It will be seen that the bar 2 extends transversely to the rim of the wheel and that the heads 12 extend substantially parallel to the portion of the rim adjacent to the bar. Consequently, when the cross chain is in its operative position the longest dimension of each end link will be transverse to the longest dimension of its adjacent head. The link 10 can only be slipped over the head 12 by moving it into one definite position, as shown in Fig. 2, and in all other positions of the link the head effectually prevents the removal of the link from the bar. This one position of removal just mentioned is so located that there is no possibility of accidental removal of the chain while in use. At the same time it can be very easily removed by the driver in the manner just described. The links 10 can turn freely about the neck portions 14 but the forces exerted on the chain while it is in use tend to hold the links 10 in substantially the positions in which they are shown in Fig. 1.

Each wheel is equipped with several bars 2 which after being secured to the wheel are permanently left on the wheels. The number of these bars varies with the diameter of the wheel and the service required, but for ordinary sizes from four to eight bars usually are employed. Whenever the driver does not wish to use the chains he merely removes each cross chain 8 in the manner above described and keeps them in the car until he desires to use them again when they may be quickly and easily placed in their operative positions.

It will readily be appreciated that this construction is very strong and sturdy and that it is well adapted to withstand the hard usage required of devices of this character. It is simple to manufacture, and the ease with which the chains may be removed or placed in position again is a great advantage since it avoids the temptation that otherwise would be present to drive without chains on slippery roads. Obviously the cross chain 8 may be replaced by any equivalent device.

What is claimed as new is:

1. An anti-skid device of the character described, comprising a chain, and a holding device for the end link of the chain comprising a part having an enlarged head and a reduced neck behind said head, said head being of a width substantially equal to the width of the opening in said link and of a length slightly less than the length of said opening and having a notch in one end thereof, whereby the end link of the chain may be passed over said head with the edge of said next adjacent link passing through said notch, and whereby said head prevents said link from passing thereover in any other relationship thereto.

2. The combination of a vehicle wheel, of a bar, means for securing said bar to said wheel in a position transversely of and behind the rim of the wheel, a head at each end of the bar extending approximately parallel to the portion of the rim of the wheel adjacent thereto, and a chain having its ends supported by the opposite end portions of said bar behind said heads, said heads being shaped to substantially fill the opening in one of said end links when the next adjacent link is at the end of said opening, whereby they permit the removal of their coöperating end links therefrom when said links are presented in a definite relationship thereto, but prevent the removal of said links in all other positions relatively thereto.

In testimony whereof I have signed my name to this specification.

GEORGE F. SNOW.